Oct. 24, 1944.  J. P. CLIFFORD  2,361,267
BY-PASS FOR SCALES
Filed May 29, 1941  3 Sheets-Sheet 1
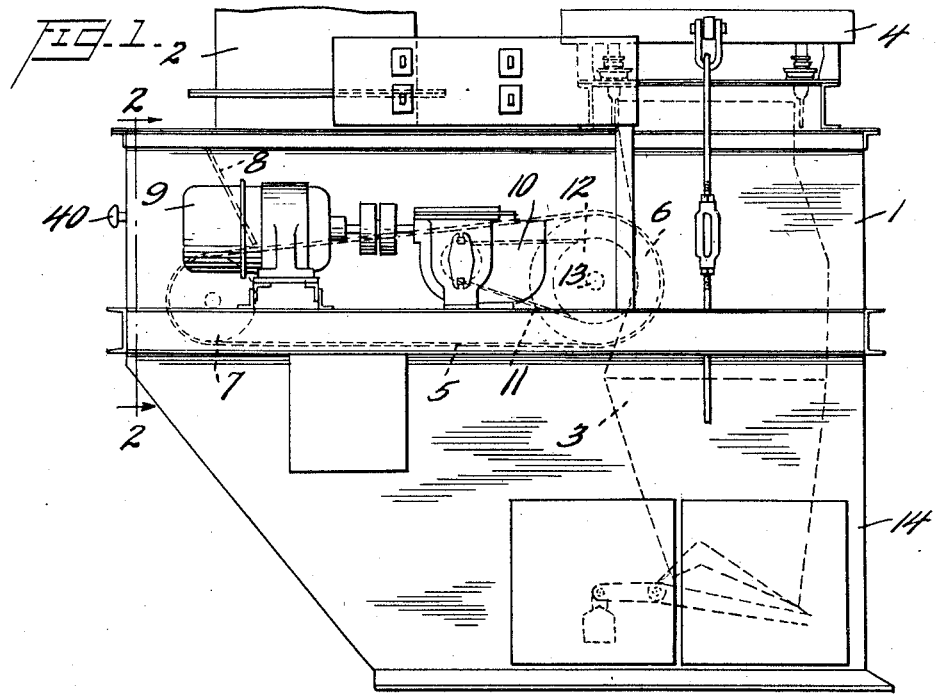
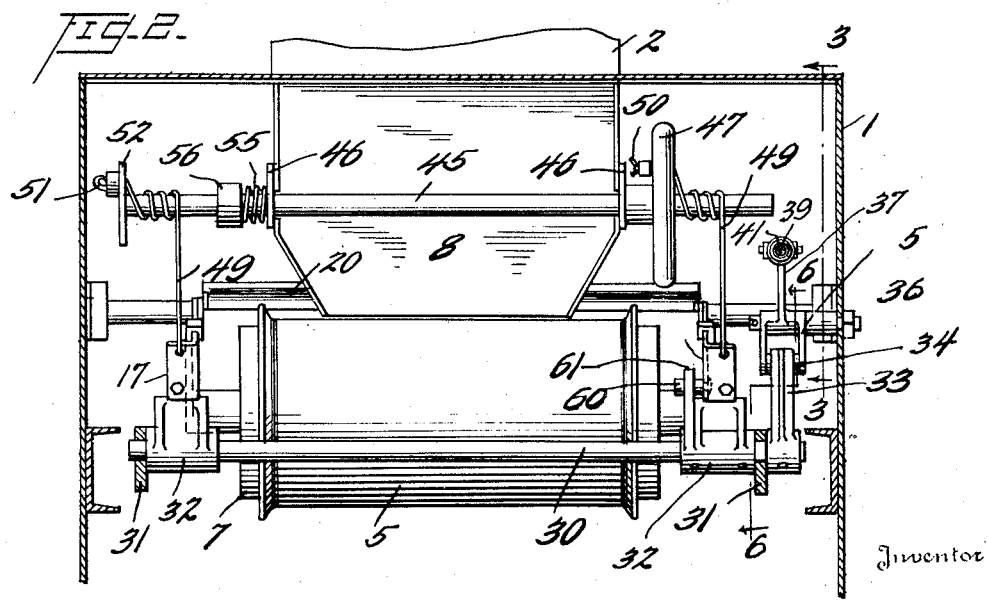
Inventor
John P. Clifford
By Norris + Bateman
Attorneys

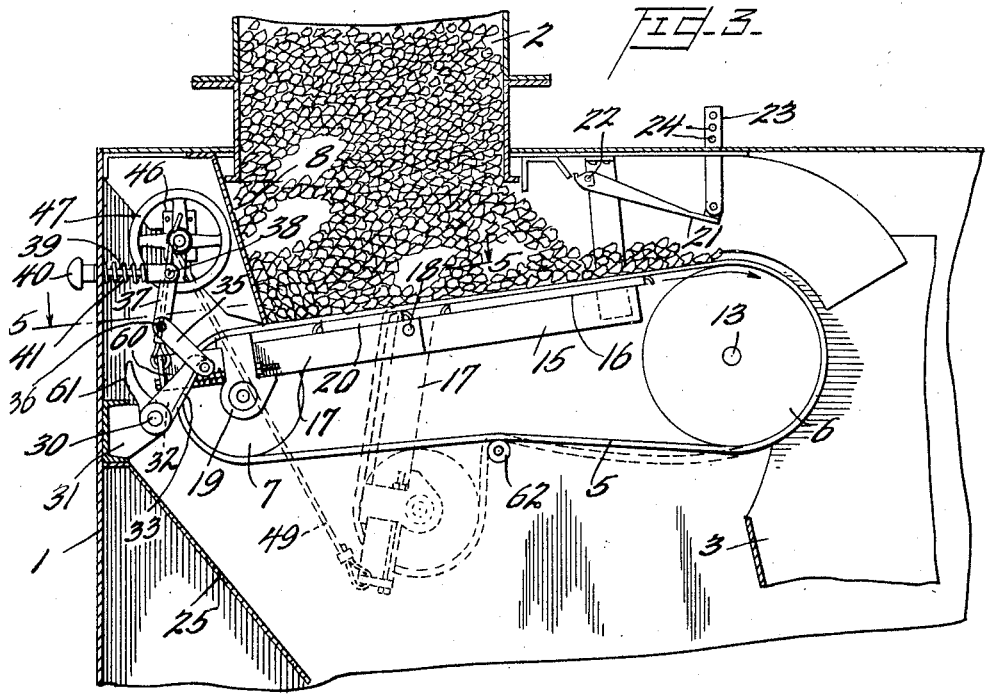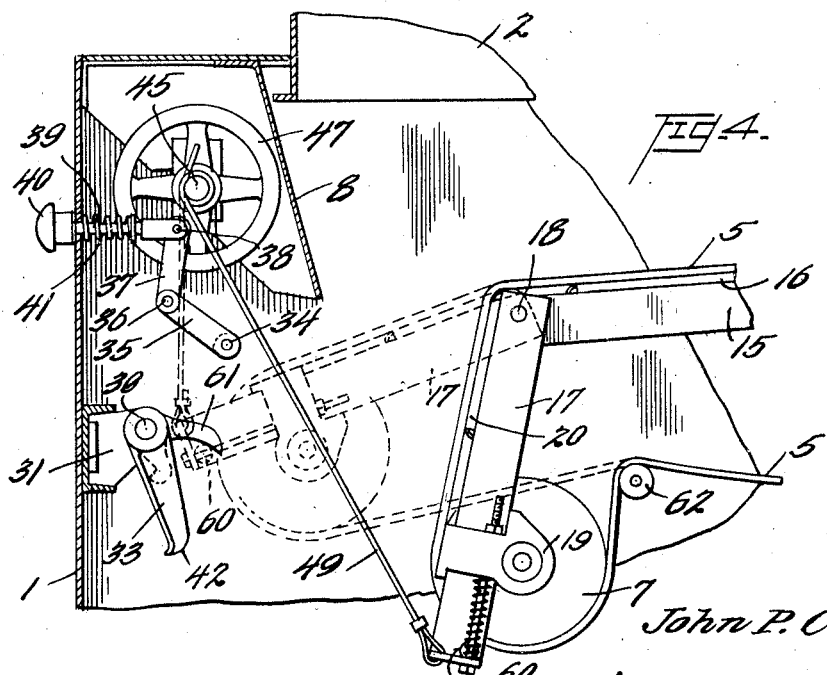

Oct. 24, 1944.  J. P. CLIFFORD  2,361,267
BY-PASS FOR SCALES
Filed May 29, 1941  3 Sheets-Sheet 3
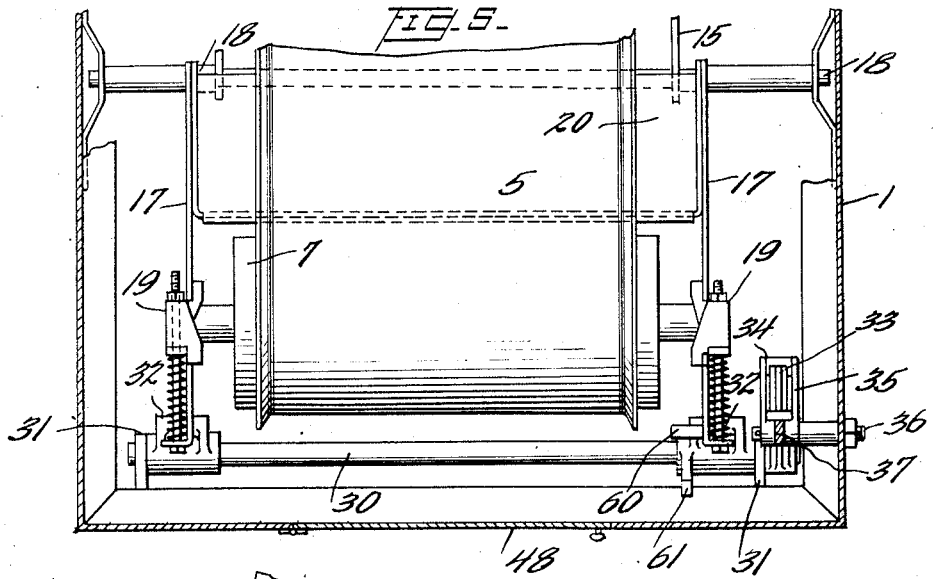
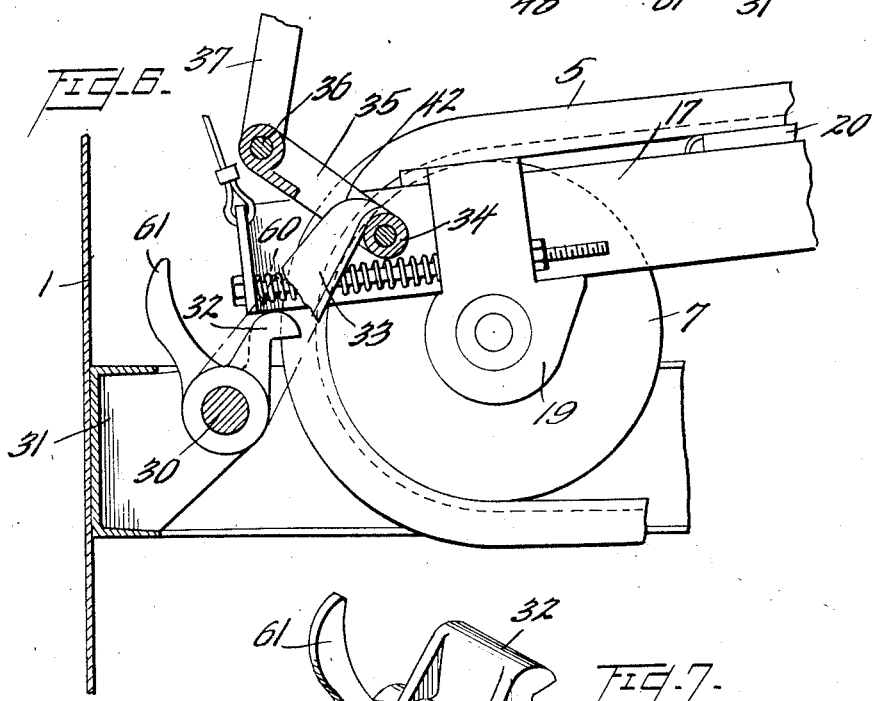
Inventor
John P. Clifford,
By Norris & Bateman
Attorneys Patented Oct. 24, 1944

2,361,267

UNITED STATES PATENT OFFICE 2,361,267

BY-PASS FOR SCALES

John P. Clifford, Passaic, N. J., assignor to Richardson Scale Company, Clifton, N. J., a corporation of New Jersey Application May 29, 1941, Serial No. 395,886

6 Claims. (Cl. 198—39)

The present invention relates to a by-pass for scales or weighing machines whereby material being weighed and fed may be by-passed and fed directly without being weighed, should such become necessary.

The invention is applicable more particularly to a by-pass for feeding coal directly to a stoker for a boiler or other furnace without being weighed, in the event the operation of the scale is interrupted due to failure of power operating the scale, or other emergency.

One of the primary objects of the invention is to provide a by-pass arrangement which can be operated quickly and with facility to by-pass an ample supply of material, and can be restored to its normal condition to permit weighing of the material.

Another object is to provide a by-pass arrangement which can be set into by-passing condition without removing or otherwise disturbing the operative relation of the elements of the material feeding means to the scale, thus facilitating the restoring of the by-pass arrangement to its normal condition to resume weighing of the material by the scale.

A further object of the invention is to provide a by-pass arrangement for a scale having a travelling belt for feeding the material to the hopper or other part of the scale in which the material is to be weighed, the by-pass arrangement enabling the feed belt to be arranged to by-pass the material without disturbing its driving connection or the adjustment of its tension, so that the difficulty and delay of disconnecting and properly reconnecting the drive or otherwise adjusting the feed belt are avoided.

To these and other ends, the invention consists in certain improvements and combinations and arrangements of parts all as will be hereinafter more fully described, the features of novelty being pointed out more particularly in the claims at the end of this specification.

In the accompanying drawings—

Fig. 1 is a side elevation, partly broken away, of a scale provided with a by-pass in accordance with the present invention;

Fig. 2 is a vertical section taken on the line 2—2 in Fig. 1;

Fig. 3 is a vertical section taken on the line 3—3 in Fig. 2, the elements of the by-pass being shown in normal position by full lines and in by-passing condition by the dotted lines;

Fig. 4 is a view similar to Fig. 3, showing the by-pass in by-passing condition;

Fig. 5 is a horizontal section, on an enlarged scale, of a portion of the structure shown in Fig. 3 and taken on the line 5—5 in that figure;

Fig. 6 is a detailed section, on an enlarged scale, taken on the line 6—6 in Fig. 2; and Fig. 7 is a detail perspective view of one of the elements of the by-pass mechanism.

Similar parts are designated by the same reference characters in the different figures.

The present invention is applicable generally to scales or weighing machines of various types, although it is applicable more particularly to those employing an endless belt for feeding the material to the hopper or other element of the scales or weighing machines in which the material is weighed.

In the present instance, the by-pass arrangement is shown applied to a power operated weighing machine of the type shown and described in my prior application Ser. No. 338,267 filed May 31, 1940, to which reference may be had for a detailed description of the construction and mode of operation thereof. It is believed sufficient for the purposes of the present invention to describe the weighing machine generally as comprising a casing 1 which may be composed of sheet metal or the like, a chute 2 through which the material to be weighed is fed to the machine from a bin or other suitable source of supply, a weigh hopper 3 in which the material is to be weighed, and scale mechanism 4 which supports the weigh hopper and weighs the material therein. The material is fed into the weigh hopper by an endless flexible belt 5 which passes around a head pulley 6 and around a tail pulley 7, the upper stretch of the belt passing immediately beneath a hopper 8 below the chute 2 so as to receive material from the latter on its upper side. The belt is driven in a direction to carry its upper stretch from the hopper 8 toward the weigh hopper 3 to deliver the material thereto by an electric motor 9 which drives a reduction gearing 10 of any suitable or well known type, the reduction gearing being connected by a chain or belt 11 to a pulley or sprocket 12 on the shaft 13 of the head pulley 6. In the normal operation of the machine, the belt occupies the position shown by the full lines in Fig. 3, it receiving material from the hopper 8 and carrying it toward and discharging it into the weigh hopper 3 in which the material is weighed, and the weighed charges of material may be dumped from the weigh hopper 3 into a hopper 14 which supplies the material to the desired point of consumption or other disposal, as for example, coal to the stoker of a steam boiler or other furnace.

In applying the present invention to a feeder as just described, the feeder is constructed to comprise a relatively fixed frame 15 having a plate 16 mounted thereon to support a portion of the upper stretch of the belt 5 as it passes beneath the hopper 8, and a hinged frame 17 which is pivoted at 18 to swing vertically in an arc about the pivot 18. The shaft 13 of the head pulley 6 is mounted in suitable relatively fixed bearings within the casing, and the tail pulley 7 is mounted in bearings 19 which are carried by the swinging frame 17, and these bearings may be slidable along the frame 17 or otherwise adjustable to properly tension the feed belt. The swinging frame 17 carries a plate 20 which underlies a portion of the upper stretch of the belt as it passes beneath the hopper 8. A levelling plate 21 may be pivoted at 22 to a relatively fixed part of the weighing machine casing to overlie the material as it is fed from the hopper 8 by the belt and to thereby regulate the depth of the material fed by the belt into the weigh hopper, this plate having a link 23 pivotally connected thereto and provided with a series of apertures 24 exposed above the top of the casing and in one or another of which apertures may be inserted a pin to support the levelling plate at different heights.

In the normal operation of the scale, the pivoted frame 17 occupies its upper full line position as shown in Fig. 3, the upper stretch of the belt then travelling toward the right in this figure across the bottom of the hopper 8 and thereby removing material therefrom and feeding it into the weigh hopper, but when the frame 17 is swung downwardly into the dotted line position shown in Fig. 3 or the full line position shown in Fig. 4, a substantial portion of the opening in the bottom of the hopper 8 is uncovered by the belt, thus providing a passageway of relatively large size through which material may by-pass directly from the hopper 8 into the discharge hopper 14, the latter being provided for this purpose with a by-pass plate 25 which is inclined toward the discharge opening in the bottom of the hopper 14 and thus directs thereto the material by-passed from the hopper 8.

According to the present invention, the pivoted frame 17 carrying the tail pulley 7 of the feed belt is supported in its elevated position so that the feed belt will normally feed material to the weigh hopper by a shaft 30 which is rotatable in suitable bearings 31 supported in relatively fixed positions within the casing, this shaft having a pair of blocks 32 fixed thereon in positions to swing upwardly into supporting engagement with the respective ends of the pivoted frame 17 of the feed belt, as shown in Fig. 6, thereby supporting the tail pulley end of the feed belt in its raised position as shown in Fig. 3 for feeding material to the weigh hopper. An arm 33 is also fixed on the shaft 30 to rotate therewith, and the end of this arm is arranged to cooperate with a roller 34 mounted rotatably in the lower end of a latch 35. This latch is pivoted as on a shaft 36 which may be bolted or otherwise fixed to a side of the casing and the latch has an arm 37 which is pivotally connected at 38 to a stem 39 which is reciprocable through the adjacent wall of the casing and is provided on its outer end and exteriorly of the casing with an operating knob 40. A compression spring 41 surrounds the stem 39 and acts thereon to yieldingly force the arm 37 inwardly, thereby retaining the roller 34 on the lower end of the latch in engagement with the underside of the arm 33. The latch thus normally prevents downward swing of the arm 33 and thereby holds the blocks 32 in supporting positions beneath the raised frame 17. However, the latch is yieldable against the action of the spring 41 to permit the arm 33 to swing upwardly from a lowered position into the position shown in Fig. 6, for which purpose the upper side of the arm adjacent to its extremity is curved or bevelled as shown at 42 so that it may ride against the roller 34 as it engages the underside thereof, thereby deflecting the roller so that the end of the arm may ride past it and then come to rest on the upper side of the roller.

Means is provided for restoring the tail pulley end of the feed belt to its normal raised position as shown by the full lines in Fig. 3 after it has swung downwardly to by-passing position as indicated by the dotted lines in that figure. Such means consists preferably of a windlass arrangement comprising a shaft 45 which is mounted to rotate in bearings 46 supported by plates mounted in fixed positions within the casing. This shaft has a hand wheel or other suitable operating member 47 fixed thereon and which is accessible for operation through a door 48 suitably located in the adjacent end wall of the casing. A pair of cables 49 are attached to the ends of the pivoted frame 17 and are adapted to be wound on the shaft 45 when the latter is rotated, one of these cables being fixed at 50 to the hand wheel 47 fixed on the shaft 45 and the other cable being fixed at 51 to a collar 52 which is fixed on the shaft 45. By this windlass-like arrangement, when the pivoted frame 17 carrying the tail pulley end of the feed belt is released by the blocks 32 said end of the feed belt will swing downwardly under its own weight and the weight of material thereon into the dotted line position shown in Fig. 3, the consequent pull on the cables 49 causing rotation of the shaft 45 to unwind the cables therefrom. In order to retard or prevent unduly rapid descent of the pivoted tail pulley end of the feed belt when released, the shaft 45 is provided with a brake which is preferably in the form of a compressed spring 55 which encircles the shaft 45 and bears at one end against a collar 56 which is fixed on said shaft and at its other end bears frictionally against the adjacent bearing 46. This brake or clutch will also prevent spinning of the shaft 45 after the cables have been unwound therefrom incident to the complete downward swing of the tail pulley end of the belt.

Means is also provided for resetting the blocks 32 and arm 33 when the tail pulley end of the belt is restored from its lowered by-passing position to its upper position for the feeding of material to the weigh hopper. Such means comprises a pin 60 which is fixed on the swinging frame 17, and a finger 61 which is fixed on the shaft 30 and may be formed as an integral part of one of the blocks 32, as shown in Fig. 7. The finger 61, after the blocks 32 have been swung into released position, as shown in Fig. 4, will be in the path of the pin 60 as the tail pulley end of the belt is swung upwardly to restore it to its normal raised position, and as the pin 60 engages the underside of the finger 61 as shown in Fig. 4 and continues to swing upwardly, the pin will rotate the shaft 30 in a direction to swing the blocks 32 upwardly into positions beneath the pivoted frame 17 and, at the same time, to swing the arm 33 upwardly into a position beneath the roller 34 on the lower end of the latch. The arm 33 may then be pulled manually upwardly to deflect the roller 34 and then engage the upper side thereof and to bring the blocks 32 into supporting engagement with the underside of the frame 17, as shown in Fig. 6. In order to support the lower stretch of the feed belt when the tail pulley end thereof is lowered into by-passing position, and thus hold this stretch of the belt above material in the hopper 14, a roller 62 is provided which is mounted to revolve freely within the casing so that it will support the lower stretch of the belt when the tail pulley end thereof is lowered into by-passing position as shown in Fig. 4.

In operation, the pivoted frame 17 carrying the tail pulley end of the belt will normally be supported in its raised position by the blocks 32, and these blocks will be held in supporting engagement with the underside of this frame by the arm 33 which in turn will be held by the latch 35. The upper stretch of the belt then extends across the bottom of the supply hopper 8, and the travelling movement of the belt as it is driven from its head pulley 6 by the motor 9 will feed the material into the weigh hopper 3, and the weighed material may be discharged from this hopper in any well known way into the hopper 14 which supplies the material to the desired point of consumption or other disposal as, for example, coal to the stoker of a steam boiler or other furnace.

In the event of power failure or other emergency which interrupts or interferes with the operation of the scale or weighing machine, the material may be supplied without interruption to the discharge hopper 14 by by-passing the material. This is accomplished by stopping the travelling movement of the feed belt, if it has not already stopped, and then pulling outwardly the knob 40. The outward pull of this knob swings the latch 35 upwardly, thereby disengaging it from beneath the retaining arm 33 and thus permitting the latter and the blocks 32 to swing downwardly under the weight of the tail pulley end of the belt and material that may be resting thereon. The tail pulley end of the belt thus swings downwardly from the full line position to the dotted line position shown in Fig. 3, and during this operation the cables 49 unwind from the shaft 45 under control of the brake or clutch 55. The downward swing of the tail pulley end of the belt uncovers a substantial portion of the opening in the bottom of the supply hopper 8, thereby providing a passageway of a size to permit the flow of an ample supply of material from the feed chute to the delivery hopper 14, the material thus by-passed being deposited on the downwardly sloping by-pass plate 25 which directs it to the outlet of the delivery hopper 14. After the latch has been thus operated to release the tail pulley end of the belt, the stem 39 on the knob 40 is released, and the latch 35 returns, under the action of the spring 41, to its original or normal position. The by-passing of the material can then continue indefinitely or until power is restored or the scale is otherwise ready for normal weighing operation.

In order to resume normal operation of the feeder to feed the material to the weigh hopper, the supply of material to the feed chute 2 is stopped momentarily and the feed chute is allowed to empty to a point below the lowered tail pulley, after which the hand wheel 47 is operated to revolve the shaft 45 in either direction to wind the cables 49 thereon. The winding of the cables on this shaft lifts the pivoted or hinged frame 17, causing the same to swing upwardly about its pivot point 18, from the dotted line position toward the full line position shown in Fig. 3. As the frame 17 rises, the pin 60 thereon engages beneath the finger 61, which is then in its path as shown in Fig. 4, and as the pivoted frame continues to rise gradually, the pin 60 swings the finger 61 upwardly, thereby rotating the shaft 30 and swinging the blocks 32 into positions beneath the frame 17 and bringing the arm 33 into position beneath the roller 34 on the latch. After the tail pulley end of the belt has been fully raised, the arm 33 is pulled up manually, thereby lifting the roller 34 and deflecting it beyond the arm 33 and after the latter passes above the roller, the latter swings into position beneath the arm 33 under the action of the spring 41, thereby holding the tail pulley end of the belt in its normal position for the feeding of the material to the weigh hopper.

Obviously the knob 40 may be attached to a solenoid or other device so that the by-pass operation may be controlled from a remote point, if desired.

The by-pass arrangement provided according to the present invention may be easily and instantly released to by-pass the material, and it may be easily and quickly restored to normal condition to resume weighing of the material. Since the head pulley which drives the belt is on the relatively fixed portion of the belt, the driving means therefor does not require disconnection or reconnection, and the operative relation of the belt to the other parts of the scale is not disturbed when the tail pulley end of the belt is swung into by-passing position.

Although the tension of the feed belt will be slackened when the tail pulley end thereof is lowered into by-passing position, its former tension will be restored when the tail pulley end of the belt is returned to normal position, so that no readjustment of the tension of the belt is necessary when the belt is returned to a position to feed the material for weighing after it has been adjusted to a position to by-pass the material.

The invention has been shown and described as applied to scales or weighing machines, but it may be applied to any other machines or apparatus employing a feeder of the belt or apron type, for by-passing material, whenever desired or necessary, instead of feeding or advancing the material by the belt or apron.

I claim:

1. In combination with a supply hopper having an open bottom, and a travelling belt supported to extend across the bottom of the hopper by a pair of pulleys, a pivoted frame carrying one of said pulleys and movable to adjust said pulley and the adjacent portion of the belt into a position to close a portion of the hopper bottom for feeding material to a given zone or into a position to uncover said portion of the hopper bottom for diverting the material from said zone, members for supporting the frame for the movable pulley for feeding material, a retaining arm for said members, a releasable holding latch for said arm, and means on said frame and controlled by movement thereof for moving said arm toward engaged relation with said latch.

2. In combination with a supply hopper, and a travelling belt extending beneath the bottom of said hopper to control the feed of material therefrom, a pivoted frame for supporting an end of said belt in a raised position to close a portion of the bottom of the hopper for feeding material to a given zone and in a lowered position to uncover said portion of the bottom of the hopper to divert the material from said zone, of members pivoted to swing into position to support the pivoted frame and respective end of the belt in raised position, an arm connected to said members for retaining them in said supporting position, a releasable holding latch for said arm, and means carried by the pivoted frame for moving said arm toward engaged relation with said latch.

3. The combination of a supply hopper, a travelling belt supported by head and tail pulleys to extend across the bottom of the hopper to control discharge of material therefrom, means for driving the head pulley to advance the belt and thereby feed material from the hopper, a frame pivotally supporting the tail pulley and the adjacent end of the belt and adjustable to feed or to divert material, members pivoted to swing into positions to support said frame and the tail pulley end of the belt to feed the material, an arm for retaining said members in said supporting positions, a latch for releasably holding said retaining arm, and means on said frame and operated thereby for moving said arm toward engaging relation with said latch.

4. The combination of a supply hopper, a weighing mechanism comprising a scale and a travelling belt supported by head and tail pulleys to extend across the hopper to control the discharge of material therefrom, and means for driving the head pulley to advance the belt, a pivoted frame for supporting the tail pulley and the adjacent end of the belt for adjustment relatively to the head pulley supported end of the belt to feed material from the hopper to the scale or to cause the material to by-pass the scale, members for supporting the frame and the tail pulley end of the belt to feed material to the scale, means for retaining said members in said supporting positions and releasable to permit movement of the frame and the tail pulley end of the belt into by-passing position, and means on said frame and adjustable therewith for returning said members toward said supporting positions relatively to said frame.

5. The combination of a supply hopper, a weighing mechanism comprising a scale and a travelling belt supported by head and tail pulleys to extend across the bottom of the hopper to control the discharge of material therefrom, means for driving the head pulley to advance the belt, and a pivoted frame supporting the tail pulley and the adjacent end of the belt for adjustment relatively to the head pulley supported end thereof to feed material to the scale or to cause the material to by-pass the scale, members for supporting said frame and the tail pulley end of the belt to feed material to the scale and releasable to permit movement of said end of the belt into by-passing position, means on said frame and movable therewith when the tail pulley end of the belt is adjusted into position to feed material to the scale for moving said members toward supporting positions relatively to said frame, a retaining arm for said members, and a holding latch engageable with said arm upon further movement of said members into supporting positions relatively to said frame.

6. The combination of a supply hopper, a weighing mechanism comprising a scale and a travelling feed belt, a pivoted frame supporting an end of the belt adjacent thereto to swing upwardly relatively to the other end of the belt into a raised position beneath the hopper for feeding material therefrom to the scale and to swing downwardly into a lowered position to provide a direct discharge from the hopper and thereby divert the material past the scale, members cooperative with said frame for releasably supporting it and the adjacent end of the belt in raised position, means on said frame for moving said members toward supporting relation therewith as said frame is swung upwardly, and a windlass connected to said frame for restoring it and the adjacent end of the belt to raised position.

JOHN P. CLIFFORD.